United States Patent [19]

Shimizu

[11] Patent Number: 4,855,655
[45] Date of Patent: Aug. 8, 1989

[54] ELECTROMAGNETIC SERVO DRIVE FOR POWER STEERING

[75] Inventor: Yasuo Shimizu, Tochigi, Japan

[73] Assignee: Honda Giken Kogyo Kabushiki Kaisha, Tokyo, Japan

[21] Appl. No.: 77,951

[22] Filed: Jul. 27, 1987

Related U.S. Application Data

[63] Continuation of Ser. No. 793,874, Nov. 1, 1985, abandoned.

[30] Foreign Application Priority Data

Nov. 2, 1984 [JP] Japan ................... 59-231758

[51] Int. Cl.$^4$ ................................. B62D 5/04
[52] U.S. Cl. ......................... 388/820; 318/2; 318/628; 180/79.1; 388/930
[58] Field of Search ............... 180/79.1, 6.44, 142, 180/143, 79; 318/628, 314, 2

[56] References Cited

U.S. PATENT DOCUMENTS

| | | |
|---|---|---|
| 2,754,465 | 7/1956 | Brier . |
| 3,511,104 | 5/1970 | Piat . |
| 4,083,422 | 4/1978 | Blakeslee ................ 180/79.1 |
| 4,415,054 | 11/1983 | Drutchas . |
| 4,448,275 | 5/1984 | Kitagawa et al. . |
| 4,478,128 | 9/1984 | Nakayama et al. . |
| 4,503,413 | 7/1985 | Buike et al. . |
| 4,518,055 | 5/1985 | Yagi et al. . |
| 4,522,278 | 6/1985 | Kitagawa et al. . |
| 4,527,653 | 7/1985 | Agarwal ................ 180/79.1 |
| 4,532,567 | 7/1985 | Kade ................ 180/79.1 |
| 4,556,116 | 12/1985 | O'Neil . |
| 4,557,342 | 12/1985 | Drutchas . |
| 4,561,515 | 12/1985 | Hashimoto ................ 180/79.1 |
| 4,570,734 | 2/1986 | Taig . |
| 4,573,545 | 3/1986 | Kalns ................ 180/79.1 |
| 4,574,903 | 3/1986 | Hashimoto ................ 180/79.1 |
| 4,577,716 | 3/1986 | Norton . |
| 4,580,649 | 4/1986 | Ohe ................ 180/79.1 |
| 4,582,155 | 4/1986 | Ohe . |
| 4,639,651 | 1/1987 | Shimizu . |

FOREIGN PATENT DOCUMENTS

| | | |
|---|---|---|
| 2056066 | 5/1972 | Fed. Rep. of Germany . |
| 2242009 | 3/1975 | France . |
| 52-71028 | 6/1977 | Japan . |
| 58105876 | 12/1981 | Japan . |
| 5911965 | 7/1982 | Japan . |
| 58-141963 | 8/1983 | Japan . |
| 59-70257 | 4/1984 | Japan . |
| 59-73362 | 4/1984 | Japan . |
| 2145678 | 4/1985 | United Kingdom . |

Primary Examiner—Bentsu Ro
Attorney, Agent, or Firm—Armstrong, Nikaido, Marmelstein, Kubovcik & Murray

[57] ABSTRACT

An electromagnetic servo device (200) includes a driving control circuit (100), for an electric motor (20) for producing auxiliary torque to be applied to an output shaft (4). A control signal (Va) is provided to thereby supply an armature current (Io) of a controlled quantity, in a controlled direction of conduction thereof, in accordance with a detection signal (Vr, Vl) from a detection mechanism (13). The detection mechanism detects a phase difference (dP) between an input shaft (1) and the output shaft (4). The rotation speed (N) of the electric motor (20) is controlled with the control signal (Va), and is proportional to the quantity of the phase difference (dP).

2 Claims, 3 Drawing Sheets

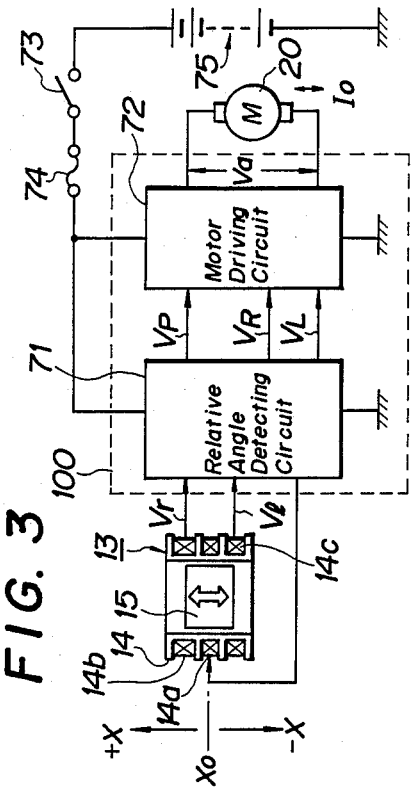
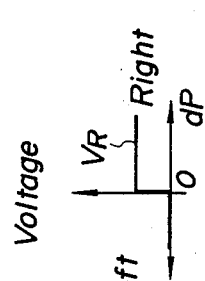
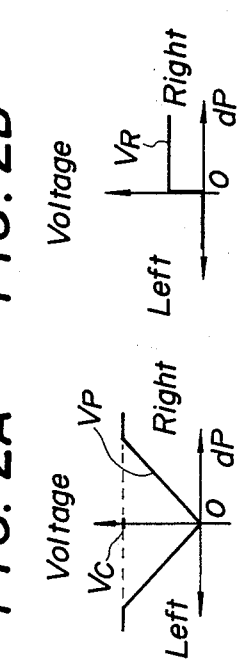
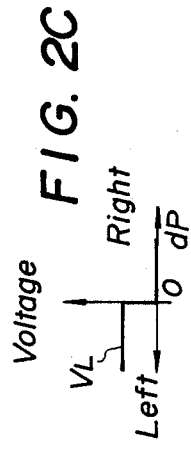
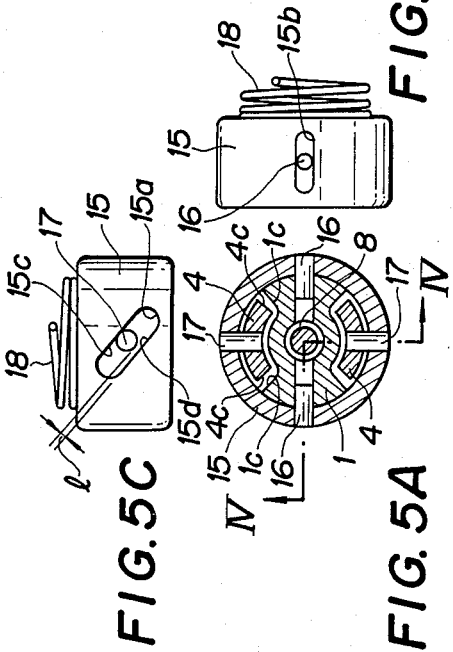
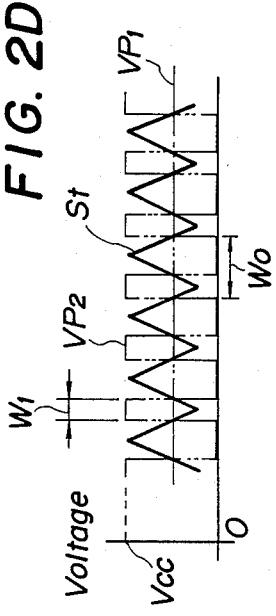

ELECTROMAGNETIC SERVO DRIVE FOR POWER STEERING

This application is a continuation of application Ser. No. 793,874 filed Nov. 1, 1985, now abandoned.

BACKGROUND OF THE INVENTION

1. Field of the Invention

The present invention generally relates to an electromagnetic servo device. More particularly, the invention relates to an electromagnetic servo device of a type suitable for use in an electric type power steering system for vehicles.

2. Description of Relevant Art

In view of problems on the hydraulic type power steering system such as that the structure thereof was complicated, recent years have proposed a variety of electric type power steering systems for vehicles. In those electric type power steering systems were employed various types of electromagnetic servo device.

Exemplarily, in Japanese Patent Application No. 59-170812, filed on Aug. 16, 1984, there has been proposed by the present applicant an electromagnetic servo device for electric power steering systems for vehicles.

This electromagnetic servo device included an input shaft operatively connected to a steering wheel, an output shaft operatively connected to a road wheel to be turned, the output shaft being coaxial with the input shaft, a torque detection mechanism operatively connected to both the input shaft and the output shaft, an electric motor rotatably disposed around the output shaft, coaxially therewith, to supply auxiliary torque thereto, and a driving control circuit for controlling to drive the electric motor in accordance with a set of detection signals of the torque detection mechanism.

The torque detection mechanism outputs a pair of signals as the detection signals thereof representing the degree as well as the direction of a circumferencewise relative angular difference developed at the input shaft relative to the output shaft when steering torque was applied to the input shaft. The signals were fed to the driving control circuit, where they were processed to produce a torque magnitude signal and a torque direction signal, to send to the electric motor an armature current of a quantity according to the torque magnitude signal, in either direction of conduction thereof in accordance with the torque direction signal, whereby the output shaft was supplied with the auxiliary torque, while electromagnetic torque developed at the electric motor was transmitted as the auxiliary torque through a speed reducing mechanism to the output shaft.

Accordingly, the armature current to be fed to the electric motor had an increasing quantity, as the circumferencewise relative angular difference between the input and the output shafts was increased with steering torque applied to the input shaft.

In this electromagnetic servo device, the torque magnitude signal had a dead zone thereof controllable to be set.

In this electromagnetic servo device, therefore, the torque developed at the electric motor was transmitted as the auxiliary torque through the speed reducing mechanism in a smooth manner to the output shaft, whereby, for a driver of the vehicle, the burden that otherwise he or she had to bear when operating the steering wheel was adequately reduced, thus providing favorable steering characteristics.

However, in such an electromagnetic servo device, as well as other conventional ones for electric power steering systems for vehicles, there has been a desideratum to be achieved, such that an output shaft was desired to be rotated with good responsiveness, in dependence on the rotation of an input shaft, or more particularly, on the speed of rotation thereof.

The present invention has been achieved to accomplish such a desideratum in a conventional electromagnetic servo device.

SUMMARY OF THE INVENTION

Accordingly, an object of the present invention is to provide an electromagnetic servo device in which an output shaft is permitted to rotate with good responsiveness, in dependence on the rotation speed of an input shaft.

To achieve such an object, the present invention provides, in an electromagnetic servo device including an input shaft, an output shaft, an electric motor means for producing auxiliary torque to be applied to the output shaft, a detection means for detecting a phase difference between the input shaft and the output shaft, and a control circuit means, for the motor means, to provide a control signal, to thereby supply an armature current of a controlled quantity, in a controlled direction of conduction thereof, in accordance with a detection signal from the detection means. The improvement in the control circuit means is provided by the control signal for the motor means to control a rotation speed of the motor means in accordance with the detection signal.

The above and further features, objects and advantages of the present invention will more fully appear from the following detailed description of a preferred embodiment of the invention when the same is read in conjunction with the accompanying drawings.

BRIEF DESCRIPTION OF THE DRAWINGS

In the drawings:

FIGS. 2A to 2D are graphs showing characteristic curves of output signals from some of principal circuit elements in the driving control circuit of FIG. 1, respectively;

FIG. 3 is a schematic block diagram of the driving control circuit of FIG. 1;

FIG. 5A is a sectional view, showing an essential part of a mechanism for detecting a relative angular displacement as a phase difference between an input shaft and an output shaft of the servo unit, along line 5A—5A of FIG. 4; and FIGS. 5B and 5C are top and side views, showing a mobile member for sensing the relative angular displacement, of the mechanism of FIG. 5A, respectively.

DETAILED DESCRIPTION OF THE PREFERRED EMBODIMENT

Figure 1:
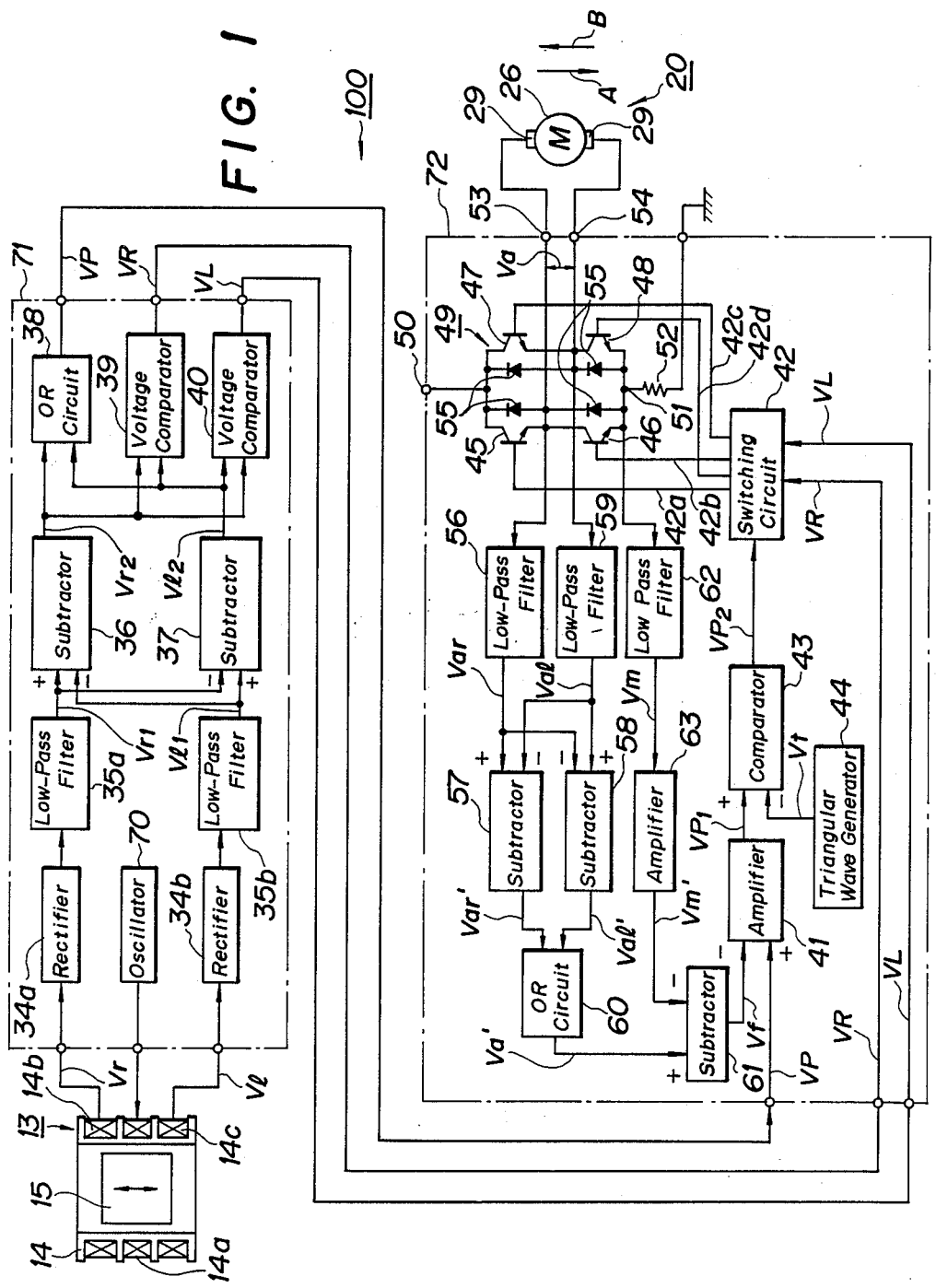
FIG. 1 is a detailed block diagram of a driving control circuit of an electromagnetic servo device according to a preferred embodiment of the present invention, as it is to be employed in an electric power steering system for vehicles.

With reference to FIGS. 1 and 3, designated at reference numeral 100 is the entirety of a driving control circuit of an electromagnetic servo device according to a preferred embodiment of the present invention, as it is equipped in an electric power steering system of a vehicle (not shown). In FIGS. 2A to 2D are shown characteristic curves of some of later-described signals to be output from the essential circuit elements of the driving control circuit 100. The structure of the electromagnetic servo device is shown in FIGS. 4 and 5A to 5C which are sectional views of the whole and an essential part, respectively, of an electromagnetic servo unit 200 constituting the electromagnetic servo device, the servo unit 200 being controlled by the driving control circuit 100. The servo unit 200 has been originally developed by the present applicant and is of a structure mechanically analogous to that disclosed in the aforesaid Japanese Patent Application No. 59-170812.

For the aid of comprehension, first the mechanical structure of the electromagnetic servo unit 200, with reference to FIGS. 4 and 5A to 5C will be described, followed by a description of the constitution as well as function of the driving control circuit 100.

Figure 4:
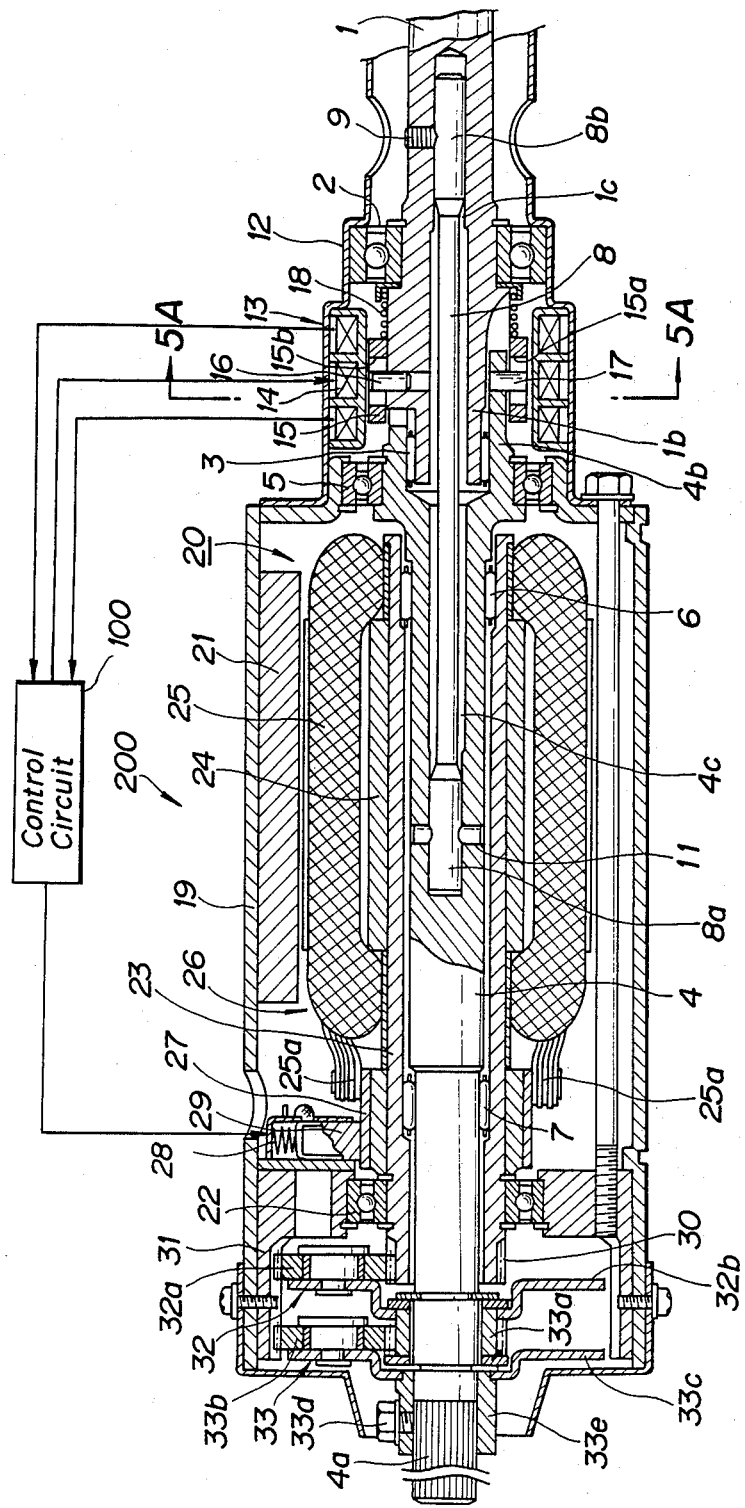
FIG. 4 is a longitudinal sectional view of a servo unit of the electromagnetic servo device which is controlled with the driving control circuit.

Shown in FIG. 4 is the sectional view as described, and more particularly, a quarter cutaway longitudinal sectional view of the electromagnetic servo unit 200.

The servo unit 200 includes an input shaft 1 rotatably supported by a ball bearing 2 as well as by a needle bearing 3 and connected at the axially outer end thereof to a steering wheel (not shown) of the power steering system. An output shaft 4 is arranged coaxial with the input shaft 1 and interconnected by a torsion bar 8 with the input shaft 1. Also the output shaft 4 is rotatably supported by a ball bearing 5 and needle bearings 6, 7. The output shaft 4 has at the axially outer end thereof a splined portion 4a operatively assembled into a rack and pinion type steering gearbox (not shown) of the power steering system.

As later described, a uniquely formed axially inner end portion 1b of the input shaft 1 is engaged at the innermost end thereof into a uniquely formed axially inner end portion 4b of the output shaft 4, where it is rotatably supported with the needle bearing 3 interposed therebetween.

The torsion bar 8 is fixed, at one end 8a thereof inserted in an axial hollow 4c of the output shaft 4, to the output shaft 4 by means of a pin 11 and, at the other end 8b inserted in an axial hollow 1c of the input shaft 1, by a screw 9 to the input shaft 1 which is thereby adapted to have, while no steering torque is acting thereon, a predetermined angular position about the axis thereof relative to the output shaft 4.

In the foregoing arrangement, steering torque from the steering wheel is applied to the input shaft 1, and transmitted therefrom through the torsion bar 8 to the output shaft 4, causing torsional deformations in the torsion bar 8, thus having a circumferencewise relative rotation angle difference, that is, a relative angular displacement as a phase difference developed at the input shaft 1 relative to the output shaft 4.

In FIG. 4, designated at reference numeral 12 is a steering column surrounding to accommodate therein the input shaft 1.

The servo unit 200 has, at an axial position thereof where the inner end portion 1b of the input shaft 1 is engaged into the inner end portion 4b of the output shaft 4, a relative rotation angle detection mechanism 13 arranged so as to extend therearound and for detecting the relative angular displacement developed between the input shaft 1 and the output shaft 4. The detection mechanism 13 is constituted with a differential transformer 14 fixed to the inner circumference of the steering column 12, and with a tubular mobile member 15 as a laminated iron core axially slidably fitted around the mutually engaged portions 1b, 4b of the input and the output shafts 1, 4. The differential transformer 14 has a pair of output terminals thereof connected to the driving control circuit 100, which is partly to electrically detect the relative angular displacement between the input and the output shafts 1, 4, while the driving control circuit 100 has a proper control function of feeding an armature current Io (FIG. 1) of a controlled quantity, in either controlled direction of conduction thereof, to a later described electric motor 20, thereby driving the motor 20 in accordance with the magnitude and acting direction of auxiliary torque to be output therefrom.

As shown in FIG. 5A, the mobile member 15 is engaged with the input shaft 1 by means of a pair of radial pins 16, 16 fixed to the input shaft 1, and with the output shaft 4 by means of another pair of radial pins 17, 17 fixed to the output shaft 4, the radial pins 17, 17 being each respectively circumferencewise spaced apart at a phase difference of 90° from one of the radial pins 16, 16. For the engagement with the radial pins 16, 16 projecting from the input shaft 1, the mobile meber 15 has a pair of engagement holes 15b formed therethrough at corresponding circumferential positions so as to elongate in the axial direction of the torsion bar 8. Also for the engagement with the radial pins 17, 17 projecting from the output shaft 4, the mobile member 15 is formed therethrough with a pair of engagement holes 15a which elongate at a skewed angle with respect to the axial direction of the torsion bar 8. The mobile member 15 is normally biassed in the axial direction, to the left in FIG. 4, with a coil spring 18 compressed to be interposed between this member 15 and the aforesaid ball bearing 2.

In the foregoing arrangement, between each of the radial pins 17 and corresponding one of the elongate holes 15a is given a clearence due to the precision of workmanship. However, at either side 15c as the working side of the hole 15a, any play due to such clearance between the pin 17 and the hole 15a is substantially eliminated by the presence of the spring 18 that normally urges the pin 17 into abutment with the working side 15c, while the other side 15d of the hole 15a has a corresponding play 1 left against the pin 17.

According to the foregoing arrangement, when the input shaft 1 is forced to rotate by steering torque applied to the steering wheel, thus transmitting torque through the torsion bar 8 to the output shaft 4, there is developed a circumferencewise relative angular difference, i.e., the relative angular displacement between the input and the output shafts 1, 4, causing the mobile member 15 to axially move, to the right or left in FIG. 4, in accordance with the direction of rotation as well as the absolute value of the angular difference that the input shaft 1 is then forced to experience relative to the output shaft 4. The relative angular displacement can thus be detected by electrically detecting the extent of the axial movement of the mobile member 15 through the differential transformer 14.

As shown in FIG. 4, the servo unit 200 includes a cylindrical casing 19 accommodating therein the aforesaid electric motor 20 coaxially arranged around the output shaft 4. The electric motor 20 is constituted as a direct current motor with a pair of magnets 21 as a field fixed to the inner circumference of the casing 19, and with a rotor 26 as an armature consisting of a tubular shaft 23 which is rotatably supported by the needle bearings 6, 7 and a ball bearing 22, and an armature core 24 which is fixed on the tubular shaft 23 and provided with an armature winding 25 arranged so as to cut, when rotated, those lines of magnetic flux developed by the magnets 21. Further, the rotor 26 is provided at the left end thereof with a slip ring assembly 27, to which the armature winding 25 has terminals 25a thereof connected in such a manner as to permit the armature current Io of necessary quantity to be sent therethrough in either direction of conduction as required. At each of necessary electrical angular positions, a brush 29 is brought into abutment with the slip ring assembly 27, while being normally urged thereagainst with a coil spring 28. Through the brush 27, the armature current Io as controlled is sent from the driving control circuit 100 into the armature winding 25.

In the foregoing arrangement, with torque applied from the steering wheel to the input shaft 1, while the input and the output shafts 1, 4 have a relative angular displacement developed therebetween to be detected by the relative rotation angle detection mechanism 13, the driving control circuit 100 is caused to function to send the armature current Io to the armature winding 25, thereby driving the electric motor 20, such that the rotor 26 rotates about the output shaft 4, independently thereof, in the same direction of rotation as the input shaft 1.

The rotation of the rotor 26 is transmitted to the output shaft 4, through a speed reducing mechanism consisting of a primary and a secondary planetary gearings 32, 33, where it is reduced in the speed and increased in the torque. In the speed reducing mechanism constituted with the two stages 32, 33 of planetary gear, the primary stage 32 consists of a primary sun gear 30 formed along the outer circumference of the left end part of the tubular shaft 23 as a primary input member, a common ring gear 31 fixed to the inner circumference of the casing 19, and a triple of primary planet gears 32a interengaged between the sun and the ring gears 30, 31. The primary planet gears 32a are pivotably supported on a disc-like flange 32b fixed to a secondary input member rotatably loose-fitted on the output shaft 4, which member has formed thereon a secondary sun gear 33a. On the other hand, the secondary stage 33 consists of the secondary sun gear 33a, the ring gear 31, and a triple of secondary planet gears 33b interengaged between the sun and the ring gears 33a, 31. The secondary planet gears 33b are pivotally supported on a disc-like flange 33c integrally joined with a tubular member 33e, which member 33e is spline-fitted on a part of the splined portion 4a of the output shaft 4 and further fixed by a radial bolt 33d also to the same shaft 4.

Accordingly, when steering torque is applied to the input shaft 1, the output shaft 4 receives, besides the torque to be transmitted thereto from the input shaft 1 through the torsion bar 8, additional torque developed by electromagnetic actions of the electric motor 20 arranged around the output shaft 4 and transmitted through the speed reducing mechanism, whereby auxiliary torque is developed at the output shaft 4. As a result, in the servo unit 200, torque applied to the input shaft 1 is apparently magnified when transmitted to be developed as output torque at the output shaft 4, and therefore the servo unit 200 is permitted to function as an electromagnetic force magnifying device, for electric type power steering systems.

From FIG. 5A, when the relative angular displacement as the phase difference between the input and the output shafts 1, 4 is enlarged to a predetermined angle (approx. 10° in this embodiment), circumferencewise moving side faces 1c of the axially inner end portion 1b of the input shaft 1 are brought into abutment, to be locked, with corresponding ones of circumferencewise locking side faces 4c of the axially inner end portion 4b of the output shaft 4. In other words, with such a locking structure between the input and the output shafts 1, 4, the electromagnetic servo unit 200 has built therein a fail-safe mechanism.

Further, in the servo unit 200, the torsion bar 8 is to serve partly for, while no steering torque is applied to the input shaft 1, holding to maintain in a stable manner the input shaft 1 at a neutral position thereof relative to the output shaft 4 and, further, partly for, when steering torque is transmitted from the steering wheel to the input shaft 1, having adequate reaction torque developed through the input shaft 1 at the end of the steering wheel.

There will be described below the constitution as well as the function of the driving control circuit 100 to control the action of the electromagnetic servo unit 200.

As schematically shown in FIG. 3, the control ciruict 100 consists of a relative-angle detecting circuit 71 as a phase difference detector for electrically detecting the angle of rotation of the input shaft 1 relative to the output shaft 4, and a motor driving circuit 72 for driving the electric motor 20. The detection circuit 71 as well as the drive circuit 72 has fed thereto electric power from a battery as a power supply 75 through a power switch 73 and a fuse 74. The differential transformer 14 of the relative rotation angle detection mechanism 13 has input to a primary winding 14a thereof an alternating current signal of a predetermined frequency from the detection circuit 71, and output from a pair of secondary windings 14b, 14c thereof a pair of detection signals Vr, Vl. These signals Vr, Vl are input to the detection circuit 71, where they are processed to be output to the drive circuit 72 in the form a combination of a voltage signal VP representing the relative angular displacement as a phase difference dP between the input and the output shafts 1, 4 and a pair of logical voltage signals VR, VL representing the direction of rotation of the input shaft 1 relative to the output shaft 4, which combination of signals VP, VR, VL as input in the drive circuit 72 is utilized to drive, in accordance therewith, the action of the electric motor 20.

The detection circuit 71 and the drive circuit 72 will be detailed below with reference to FIG. 1.

The differential transformer 14 of the detection mechanism 13 has, as described, the primary winding 14a fed with the alternating electric current signal of the predetermined frequency from an oscillator 70 of the detection circuit 71, and the secondary windings 14b, 14c to output the detection signals Vr, Vl therefrom as a pair of alternating-current voltage signals with a differentially varying amplitude in accordance with the axial displacement of the mobile member 15 of the transformer 14. The detection signals Vr, Vl are first rectified through a pair of rectifiers 34a, 34b and smoothed by a pair of low-pass filters 35a, 35b, to be supplied as a pair of direct-current voltage signals $Vr_1$, $Vl_1$ to a pair of subtractors 36, 37, respectively.

In the foregoing arrangement, the mobile member 15 is to take, in FIG. 3, a neutral position Xo thereof when the relative angular displacement between the input and the output shafts 1, 4 is zero with no steering torque applied to the input shaft 1. Further, it is to move, in FIG. 3, in the direction of $+X$ when the input shaft 1 as viewed at the side of the steering wheel is rotated to the right with respect to the output shaft 4 with clockwise acting torque applied to the input shaft 1, and to the contrary in the direction of $-X$ when the input shaft 1 is rotated to the left relative to the output shaft 4 with counterclockwise acting torque applied to the input shaft 1.

The voltage signals $Vr_1$, $Vl_1$ output from the low-pass filters 35a, 35b are controlled to be at a differentially varying level in accordance with the axial displacement of the mobile member 15, that is, the vertical movement thereof in FIG. 1, and thus to be at a predetermined voltage level when the member 15 is situated in the neutral position Xo.

More particularly, the connection of the differential transformer 14 to as well as the aforementioned circuitry of the detection circuit 71 is made such that, when the mobile member 15 is caused to move upwardly in FIG. 1 with the input shaft 1 clockwise rotated relative to the output shaft 4, the voltage of the signal $Vr_1$ rises from the predetermined level in proportion to the upward movement of the member 15 while that of the signal $Vl_1$ falls, and to the contrary, when the member 15 is caused to downwardly move in FIG. 1 with the input shaft 1 counterclockwise rotated relative to the output shaft 4, the former $Vr_1$ falls and the latter $Vl_1$ rises in proportion to the downward movement.

The voltage signal $Vr_1$ from the low-pass filter 35a is lead to both a plus input terminal of the subtractor 36 and a minus input terminal of the subtractor 37, and the voltage signal $Vl_1$ from the low-pass filter 35b, to both a minus input terminal of the former 36 and a plus input terminal of the latter 37.

The subtractors 36, 37 are to ouput a pair of voltage signals $Vr_2$, $Vl_2$ respectively, such that $Vr_2 = Vr_1 - Vl_1$ and $Vl_2 = Vl_1 - Vr_1$.

In this respect, in the control circuit 100 supplied with electric power from the power supply 75 of positive polarity, even under such a condition that $Vr_1 < Vl_1$ for example, the signal $Vr_2$ output from the subtractor 36 has a voltage thereof kept from becoming negative, whereas under such condition it substantially approaches zero at the positive side. Such characteristic is analogous to the voltage signal $Vl_2$ from the subtractor 37, as well.

In the foregoing circuit arrangement, therefore, under the condition that the mobile member 15 is located at the neutral position Xo, the voltages of the signals $Vr_2$, $Vl_2$ from the subtractors 36, 37 are both rendered substantially zero.

The output signals $Vr_2$, $Vl_2$ of the subtractors 36, 37 are each respectively input to both an OR circuit 38 and a pair of voltage comparators 39, 40.

At the OR circuit 38, the input signals $Vr_2$, $VL_2$ are logically added to obtain a relative angle difference or phase difference representative signal as the voltage signal VP to be output to the drive circuit 72.

On the other hand, at one 39 of the voltage comparator 39, 40 is obtained a direction of relative rotation or direction of phase difference representative signal as the logical signal VR to be output therefrom, such that the signal VR has a voltage thereof set at a "high" level when the input signal $Vr_2$ is higher in the level than the input signal $Vl_2$ and at a "low" level when the former $Vr_2$ is equal to or lower than the latter $Vl_2$ and at the other comparator 40 there is obtained another signal representing the direction of relative rotation or that of phase difference, as the logical signal VL to be output therefrom, such that the signal VL has a voltage thereof set at a "high" level when the input signal $Vl_2$ is higher in the level than the input signal $Vr_2$ and at a "low" level when the former $Vl_2$ is equal to or lower than the latter $Vr_2$. The logical signals VR, VL are also fed to the drive circuit 72.

In the foregoing circuit arrangement, the signal VP is a direct current voltage signal as an angle difference signal of a level that is proportional to the angle of the relative angular displacement between the input and the output shafts 1, 4 and thus able to be utilized to know this angle. On the other hand, the signals VR, VL are a pair of logical voltage signals as rotation direction signals representing the direction of angular displacement of the input shaft 1 relative to the output shaft 4 and hence it is possible to know this direction from them. Exemplarily, when set at the "high" level, the rotation direction signal VR implies that the input shaft 1 is rotated in the clockwise direction relative to the output shaft 4, while the rotation direction signal VL is then set at the "low" level. To the contrary, the signal VL as set at the "high" level implies that the input shaft 1 is rotated in the counterclockwise direction relative to the output shaft 4, while the signal VR is then set at the "low" level.

The signals VP and VR, VL have characteristic curves thereof inclined and stepped as shown in FIGS. 2A and 2B, 2C, respectively.

As shown in FIG. 2A, the angle difference signal VP has an upper limit thereof at a voltage level Vc corresponding to such a relative angular displacement between the input and the output shafts 1, 4 as enlarged to the predetermined phase difference, where the fail-safe mechanism consisting of the respective axially inner end portions 1b, 4b of the shafts 1, 4 is put in service.

Hereinbelow, detailed description will be made of the drive circuit 72, with reference again to FIG. 1.

The voltage signal VP having a varying level in proportion to the relative angle difference dP is fed to a plus input terminal of a differential amplifier 41, and the logical signals VR, VL set at the "high" or "low" voltage level in accordance with the direction of the relative rotation are fed both to a later described switching circuit 42. At the amplifier 41, the signal VP is processed in a later described manner to produce a voltage signal $VP_1$ which is output to a plus input terminal of a voltage comparator 43, where it is compared with a triangular pulse signal Vt input to a minus input terminal of the comparator 43 from a triangular wave generator 44, thereby obtaining a rectangular pulse signal $VP_2$ to be output from the comparator 43 to the switching circuit 42.

The rectangular pulse signal $VP_2$ obtained at the comparator 43 by comparing the voltage of the input signal $VP_1$ with that of the triangular pulse signal Vt is given as a voltage signal having a source level Vcc when the signal $VP_1$ is higher in the level than the signal Vt, so that, as exemplarily shown in FIG. 2D, there is obtained as the signal $VP_2$ a pulse signal having a frequency synchronized with the triangular pulse signal Vt and a varying pulse width $W_1$ in proportion to the voltage level of the output signal $VP_1$ of the amplifier 41. Accordingly, as will be understood from FIG. 2D, the pulse signal $VP_2$ as output from the comparator 43 has a mean voltage $VM_1$, such that $VM_1 = Vcc \times (W_1/Wo)$ where Wo is the pulse duaration of the rectangular pulse signal $VP_2$ synchronized with the triangular pulse signal Vt. The mean voltage $VM_1$ of the $VP_2$ is proportional to the voltage level of the signal $VP_1$, as a matter of course.

The aforesaid switching circuit 42 is to control the terminal polarity of the electric motor, when applying thereacross a controlled drive signal with a varying mean voltage in correspondence to the mean voltage $VM_1$, as will be descried below.

The switching circuit 42 has later described controlled voltage signals output therefrom, through four terminals 42a, 42b, 42c, 42d thereof connected to the bases of four npn transistors 45, 46, 47, 48 consituting four bridge sides of a bridge circuit 49, respectively. The bridge cirucit 49 is constituted as a polarity determining switch circuit with the transistors 42a to 42d utilized as switching elements thereof, in which the bridge sides of the transistors 45, 47 has a terminal 50 lead from therebetween to be connected as a supply side terminal to a positive terminal of the power supply 75 (FIG. 3) and further the bridge sides of the transistors 46, 48 has a terminal 51 lead from therebetween to be connected as a ground side terminal through a resistor 52 of a resistance Ra to the ground. Also from between the sides of the transistors 45, 46 and between those of the transistors 47, 48 are lead terminals 53, 54, respectively which are connected, as a pair of output terminals reversible of the polarity in accordance with on-off actions of the transistors 45 to 48, to the brushes 29, 29 of the electric motor 20, respectively. In the circuit 49, the bridge sides of the transistors 45 to 48 each respectively have one of four diodes 55 connected in parallel thereto, between the collector and the emitter thereof, to prevent reverse flow of direction-controlled electric current.

In the foregoing circuit arrangement, the switching circuit 42 is to conduct the rectangular pulse signal $VP_2$ to the bases of the transistors 45, 48 when the logical signal VR is "high" and the logical signal VL is "low", and to the contrary to those of the transistors 46, 47 when the former VR is "low" an the latter VL is "high", while the signals VR, VL are controlled to be set at "high" level in an exclusive manner.

Exemplarily, when the rotation direction representative logical signal VR is set at the "high" level, the rectangular pulse signal $VP_2$ from the comparator 43 is fed to the bases of the transistors 45, 48, turning them on, so that a voltage Va is applied across the electric motor 20 with corresponding polarity, sending thereto the armature current Io in the direction of A in FIG. 1, whereby the rotor 26 of the motor 20 is driven to rotate to the right in accordance with the direction of rotation of the input shaft 1 relative to the output shaft 4.

To the contrary, when the logical signal VL is set at the "high" level, the pulse signal $VP_2$ is fed to the bases of the transistors 46, 47, turning them on, so that the voltage Va is applied across the electric motor 20 with corresponding polarity, sending thereto the armature current Io in the direction of B in FIG. 1, whereby the rotor 26 of the motor 20 is rotated to the left in accordance with the direction of the relative rotation.

Accordingly, the voltage Va applied across the electric motor 20 has an effective value thereof corresponding to the mean voltage $VM_1$ of the rectangular pulse signal $VP_2$.

With respect to the electric motor 20, across which the voltage Va is applied to send the armature current Io, it will be easily understood that, if a load imposed as torque from the output shaft 4 onto the motor 20 is constant, the rotating speed N as the number of revolutions per unit time (hereinafter typically called "rpm") is fundamentally proportional to the level as effective value of the voltage Va, whereas the quantity as effective value of the armature current Io is determined from the load torque in a unique manner. The rotating speed N in terms of rpm of the electric motor 20 is thus controllable by regulating the level as of effective value of the voltage Va.

As shown in FIG. 1, the terminal 53 has a voltage as a potential thereof relative to the ground for example, which voltage is applied to be input as a voltage signal Var through a low-pass filter 56 to a plus input terminal of a subtractor 57 and to a minus input terminal of another subtractor 58, while the terminal 54 also has a voltage as a potential thereof, which is applied to be input as a voltage signal Val through another low-pass filter 59 to a minus input terminal of the subtractor 57 and a plus input terminal of the subtractor 58. From the subtractors 57, 58 are output a pair of voltage signals Var', Val', respectively, which are input to an OR circuit 60, where they are logically added to obtain a voltage signal Va' to be output, as a representative signal of the absolute value of the voltage difference across the electric motor 20, to a plus input terminal of of a still another subtractor 61, which is fed at a minus input terminal thereof with an armature current representative signal Vm' as a voltage signal output from a direct-current amplifer 63. The amplifier 63 has input thereto a direct-current voltage signal Vm obtained by passing the voltage of the ground side terminal 51 of the bridge circuit 49, as a potential with respect to the ground at a positive terminal of the resister 52, through a low-pass filter 62.

In the foregoing circuit arrangement, the signal Va' fed to the plus input terminal of the subtractor 61 has a voltge level corresponding to the effective value of the voltage Va across the electric motor 20, and on the other hand the signal Vm' fed to the minus input terminal of the subtractor 61 has a voltage level corresponding to the potential at the positive terminal of the resistor 52, which potential is in correspondence to the effective value of the armature current Io. As a result, by giving a proper amplification factor to the direct-current amplifier 63, the subtractor 61 is to have at the output side thereof a feedback voltage signal Vf correspondent to a counter electromotive force developed across the electric motor 20 in accordance with the load torque thereto. In this respect, the level of the voltage signal Vf to be output from the subtractor 61 is proportional to the rotating speed N of the electric motor 20.

As shown in FIG. 1, the output signal Vf of the subtractor 61 is applied to a minus input terminal of the aforementioned differential amplifier 41, which in turn outputs the voltage signal $VP_1$ at a varying level in proportion to the difference between the voltage signal VP, of which level is proportional to the relative angle difference dP, and the voltage signal Vf, of which level is proportional to the rotating speed N of the electric motor 20. The signal $VP_1$ is then input to the comparator 43, where it is processed to obtain the rectangular pulse signal VP2, which is employed at the switching circuit 42 to drive the electric motor 20 in either desired direction of rotation thereof, as described. As a result, the output shaft 4 is to be rotated by the electric motor 20 at a varying speed in proportion to the relative angle difference dP as a phase difference between the input and the output shafts 1, 4.

Herebelow, description will be made of the feedback voltage signal Vf to be fed to the minus input terminal of the differential amplifier 41.

The signals Var', Val' output from the subtractors 57, 58 are given as voltage signals, such that:

$$Var' = A_1 \times (Var - Val); \text{ and}$$

$$Val' = A_1 \times (Val - Var),$$

where $A_1$ is an amplification factor, such that the factor $A_1$ becomes substantially equal to zero at the positive side if Var<Val at the subtractor 57 and Var>Val at the subtractor 58, like the case of the aforementioned subtractors 36, 37.

The output signal Va' of the OR circuit 60 is resulted by taking the logical sum of the above signals Var', Val' and hence has a voltage level always correspondent to the absolute value as an effective value of the voltage Va as applied to the armature of the electric motor 20, such that:

$$Va' = A_1 \times |Var - Val| = A_1 \times |Va| \quad (1)$$

On the other hand, the signal Vm obtained by passing the positive terminal potential of the resistor 52 through the low-pass filter 62 has a voltage level, such that:

$$Vm = Ra \times Im \quad (2),$$

where Ra is the resistance of the resistor 52, and Im is the means value as the effective value of the armature current Io.

There is a relation such that:

$$Va = Im \times Rm + Vs \quad (3),$$

where Rm is the internal resistance of the electric motor 20, and Vs is an induction voltage as the counter electromotive force of the motor 20.

The signal Vm is amplified at the amplifier 63, to be output as the signal Vm', so that:

$$Vm' = A_2 \times Vm \quad (4),$$

where $A_2$ is an amplification factor.

The signals Va' and Vm' are fed to the plus and the minus input terminals of the subtractor 61, to obtain the feedback signal Vf, such that:

$$Vf = A_3 \times (Va' - Vm') \quad (5),$$

where $A_3$ is an amplification factor.

By substituting expression (1) to expression (3), $$Va' = A_1 \times |Im \times Rm + Vs| \quad (6)$$

Rm is always of a positive value, and also Im×Rm and Vs are same in the sign when the armature current Io is sent in either direction of conduction. Therefore, expression (6) can be written such that:

$$Va' = A_1 \times Rm \times |Im| + A_1 \times |Vs| \quad (6')$$

Substituting expression (4) to expression (2), $$Vm' = A_2 \times Ra \times Im \quad (7)$$

Substituting expressions (6') and (7) to expression (5), $$Vf = A_3 \times (A_1 \times Rm \times |Im| + A_1 \times |Vs| - A_2 \times Ra \times Im) \quad (8)$$

Since the positive terminal potential of the resistor 52 is constant in the sign, the current value Im in expressions (2) and (7) as basis of the signal Vm' to be determined by the resistor 52 always has a positive value.

Accordingly, the value of Im of term $A_2 \times Ra \times Im$ in expression (8) is always positive.

In this embodiment, the amplification factor $A_1$ of the subtractors 57, 58 and the amplification factor $A_2$ of the amplifier 63 are determined such that:

$$A_1 \times Rm = A_2 \times Ra$$

Thus, by eliminating terms of $A_1 \times Rm \times |Im|$ and $A_2 \times Ra \times Im$ in expression (8), there will be given an expression such that:

$$Vf = A_3 \times A_1 \times |Vs| \quad (9)$$

As described, the voltage Vs is the induction voltage as the counter electromotive force of the electric motor 20, while the counter electromotive force is proportional to the rotating speed N of the motor 20, and therefore:

$$Vs = Ke \times N \quad (10),$$

where N is the rotating speed in terms of rpm taking into account the direction of rotation, and Ke is a coefficient of voltage induction in terms of volt per rpm.

Substituting expression (10) to expression (9), $$\begin{aligned} Vf &= A_3 \times A_1 \times |Ke \times N| \\ &= A_3 \times A_1 \times Ke \times |N| \\ &= k \times |N|, \end{aligned} \quad (11)$$

where $k = A_3 \times A_1 \times Ke$

As will be comprehended from expression (11), the output signal Vf of the subtractor 61 has a voltage proportional to the absolute value of the rotating speed N of the the electric motor 20, that is, the number of revolutions per unit time thereof.

In the foregoing description, the voltage signal VP to be fed to the plus input terminal of the differential amplifier 41 is given as a signal representing the circumferencewise relative angle difference dP as the phase difference between the input and the output shafts 1, 4, and further, as described, the voltage Va to be applied across the electric motor 20 is correspondent to the output signal $VP_1$ of the amplifier 41, while the signal $VP_1$ is obtained by negatively feeding back the voltage signal Vf to the voltage signal VP, the signal Vf being in correspondence with the rotating speed N of the electric motor 20, so that the signal Va has a voltage substantially proportional to that of the signal VP. Accordingly, the electric motor 20 is driven to rotate at a speed N (rpm) in proportion to the phase difference dP between the input and the output shafts 1, 4.

It will be understood that the circuit elements 56, 59, 57, 58, 60, 51, 62, 63 and 61 are to cooperate together to feed back the signal Vf according to the rotating speed N of the electric motor 20, to thereby stabilize the rotation thereof depending on the signal VP.

As will be understood from the foregoing description, in the electromagnetic servo device according to the this embodiment, the number of revolutions or the rotating speed N of the electric motor 20 is controlled in accordance with the relative angle difference as the phase difference between the input and the output shafts 1, 4, so that the electric motor 20 is permitted to be speed-controlled favorably depending on actions of the shafts 1, 4.

For example, with steering torque gently applied from the steering torque to the input shaft 1, when the relative angle difference dP between the input and the output shafts 1, 4 is developed into a relatively small angle, then the electric motor 20 is driven to rotate at relatively low rotation speeds, supplying auxiliary torque through the reduction gears 32, 33 to the output shaft 4, which is thus forced to move at relatively low speeds to a position where the input shaft 1 is rotated.

On the other hand, with steering torque suddenly applied to the input shaft 1, when the relative angle difference dP between the shafts 1, 4 is developed into a relatively large angle, then the electric motor 20 is driven to rotate at relatively high rotation speeds, whereby the output shaft 4 is forced to move at relatively high speeds to a position where the input shaft 1 is rotated. As the output shaft 4 approaches the rotated position of the input shaft 1, however, the relative angle difference dP between the shafts 1, 4 becomes smaller, thus correspondingly reducing the rotating speed N of the electric motor 20.

Due to such speed control of the electric motor 20, the output shaft 4 is caused to rotate, smoothly following up the rotation of the input shaft 1, without developing delay therefrom. Further, in correspondence to the follow-up rotaion of the output shaft 4 to the input shaft 1, the rotating speed N of the electric motor 20 is automatically changed in a gradually reducing manner with decrease of the relative angle difference dP, whereby the output shaft 4 is effectively prevented against overrun due to the moment of inertia of the rotor 26 of the motor 20.

In other words, when the input shaft 1 is caused to rotate, the electric motor 20 and thus the output shaft 4 is successfully controlled to be driven to follow up the rotation of the input shaft 1, in a stable manner, with favorable responsiveness thereto.

Still more, in the follow-up rotation of the output shaft 4 in response to the rotation of the input shaft 1, the rotating speed N of the electric motor 20 is controlled, taking advantage of the relative angle difference dP, so as to be varied depending on the magnitude of a load imposed as torque on the output shaft 4. Exemplarily, where the input shaft 1 is caused to quickly rotate so as to have a relatively large angle difference dP with respect to the output shaft 4, if the load imposed on the output shaft 4 is smaller than intended, then the rotating speed N of the direct-current electric motor 20 tends to be shifted toward a high speed region thereof, due to its own operating characteristics, exceeding a point intended by the signal VP. However, when the speed N has become larger, even though a little, then the feedback signal Vf has a correspondingly enlarged voltage as will be understood from expression (11), so that, by the function of the circuit elements 44, 43, 42, and 49, the voltage Va across the electric motor 20 is reduced, thereby preventing increase in the speed N.

In other words, the output shaft 4 is effectively controlled to be driven to rotate, following up the input shaft 1 in a stable manner, with favorable responsiveness thereto and besides in sufficient consideration of the load torque imposed on the output shaft 4.

Although there has been described what is at present considered to be the preferred embodiment of the invention, it will be understood that the present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description.

I claim:

1. An electromagnetic servo device comprising:
    an input shaft;
    an output shaft;
    an electric motor for producing assistive torque to be applied to said output shaft;
    detecting means for detecting a phase difference between said input and output shafts and for producing a phase difference signal corresponding to the magnitude and direction of said phase difference; and
    motor control means for driving said electric motor and for controlling the rotational speed of said electric motor, said motor control means comprising,
    a first circuit means, coupled to said detecting means for producing a phase difference magnitude signal and a phase difference direction signal corresponding to the magnitude and direction of said phase difference detected by said detecting means,
    feedback circuit means for generating a rotational speed feedback signal corresponding to the rotational speed of said motor, said rotational speed feedback signal being generated by subtracting an armature current signal corresponding to the armature current from a voltage signal corresponding to the armature voltage and for feeding back said rotational speed feedback signal for combination with said phase difference magnitude signal,
    a second circuit means, coupled to said first circuit means, said feedback circuit means, and said electric motor, for receiving said phase difference magnitude and direction signals and said rotational speed feedback signal, and for producing a driving pulse for said electric motor, said driving pulse having a voltage polarity which is a function of said phase difference direction signal and a mean voltage level which is a function of the combination of said phase difference magnitude signal and said rotational speed feedback signal.

2. An electromagnetic servo device according to claim 1, further comprising
    a speed reducing mechanism for transmitting motor torque of said electric motor to said output shaft, in a speed reducing manner.

* * * * *